Patented May 17, 1949

2,470,374

UNITED STATES PATENT OFFICE 2,470,374

PROCESS FOR THE PRODUCTION OF FOOD PREPARATIONS FROM POTATOES AND SIMILAR FARINACEOUS TUBERS

Martin Carl Schaul, London, England

No Drawing. Application August 17, 1946, Serial No. 691,398. In Great Britain February 22, 1943

Section 1, Public Law 690, August 8, 1946
Patent expires February 22, 1963

3 Claims. (Cl. 99—207)

This invention relates to a process for the production of food preparations from potatoes and similar farinaceous tubers, and aims at producing products of a crisp nature, which have an attractive taste and appearance, good storing properties and do not require any further preparation, such as cooking or baking prior to consumption.

A process for the production of a puffed product from starchy materials and, inter alia, potatoes, has already been proposed which comprises peeling and steaming potatoes and converting them into a plastic or mashed form in which the starch is partly cooked, thereupon placing the mashed material in a compression chamber wherein it is subjected to a pressure of 2,000 to 3,000 pounds per square inch and is forced thereby through heating tubes from which it issues in the form of a number of continuous ribbons through one or more orifices into a chamber at reduced pressure, whereby it is suddenly released from pressure and thereby converted into a puffed product.

In contradistinction to the foregoing proposal, the process of the present invention broadly comprises, first subjecting peeled potatoes or similar farinaceous tubers to a treatment adapted to gelatinise part of the starch and to burst some of the starch cells, without however completely cooking the tubers, thereupon mashing the thus treated material, converting the mashed product at atmospheric pressure and at a temperature below the boiling point of water, into a form adapted for rapid and uniform drying, thereupon subjecting the product to a short intense baking treatment, and finally drying the product to a low moisture content.

The gelatinisation and bursting of a part of the starch cells can be effected by a short treatment of the peeled tubers with boiling water or steam which treatment may be preceded by a dry heat treatment.

The conversion into a form adapted for rapid and uniform drying is preferably effected by extrusion or rolling to produce shapes such as rods, filaments, tubes, sheets, flakes or discs. Such shaping may be effected by extrusion presses, flat bed presses, rollers or the like. Alternatively the mash can be converted into the form of drops, granules or the like small discrete particles, for example by pressing the mash through a screen, the bottom of which is pierced with holes, the size and shape of which may vary, according to the grain size and shape required. By jolting the screen the granules pressed through the screen are detached and fall onto a suitable support placed beneath the same.

The short intense baking treatment hereinbefore referred to can be carried out at a temperature of between 200° and 220° C. for a period generally not exceeding 10 minutes and serves to render the product crisp and palatable. This baking treatment is then followed by a drying treatment carried out at a considerably lower temperature (i. e. well below the boiling point of water).

In cases where peeled tubers are treated by the process of the present invention, whole or cut to a uniform but large size, it is advantageous to subject them to a dry heat treatment at a temperature exceeding 200° C. in order to set up initial gelatinisation and bursting of the starch cells which is completed by the subsequent treatment with boiling water or steam.

Advantageously flavouring or other ingredients, such as salt, cheese, treacle, meat extract, spices or the like can be incorporated with the mash prior to shaping, baking and drying.

Moreover aerating agents such as carbonates may be incorporated with the mash for the purpose of causing the products to swell up to yield a "puffed" product.

According to one embodiment of the invention, graded potatoes are first treated in a commercial washing and rubbing machine in order to remove the outer skin. The clean potatoes are cut into large pieces, for instance halves, of uniform size and are then transferred to an oven wherein they are subjected to a dry heat treatment at a temperature of about 215° C. for a period of about 45 minutes. In order to assist the treatment, the potatoes may be sprayed with a very dilute solution (e. g. 0.02 to 0.05%) of a mineral acid such as hydrochloric acid or an organic acid such as lactic acid, prior to being introduced into the drying oven.

At the commencement of the heat treatment, moisture is driven off from the surface of the potato pieces, thereby cooling them. Gradually the outside layer of each piece of potato attains a temperature sufficient to make the starch cells begin to swell. At the same time an outer layer of partly gelatinised starch is formed on each piece of potato which acts as an insulating layer and heat penetration into the inner part of the potato pieces proceeds only slowly. The gelatinisation proceeds into the interior and only gradually approaches a more complete state in the outer layer. Meanwhile the outer layer undergoes further changes. The starch is more or less completely gelatinised, a number of starch cells have burst and owing to the rising temperature the starch begins to lose water and becomes dextrinised, ultimately forming an outer skin of dextrinised starch which at this stage acts in the same way as the skin of potatoes when baked in their jacket. The potato pieces are removed from the oven when still essentially underdone, i. e. having a substantial core of material, the starch of which is only slightly swollen whereas the pectin compounds are already sufficiently softened to permit of mechanical disintegration.

The thus treated potatoes are next transferred to a chamber wherein they are exposed to a treatment with steam at a pressure of 1 to 1.5 atmospheres for a period of about 5 minutes. This steam treatment softens and partly dissolves the outer dextrinised skin and continues the dextrinisation of the underlying layer of partly dextrinised starch whilst at the same time causing a considerable part of the starch cells of this layer to burst. The material now contains a large proportion of slightly swollen starch grains.

The potato pieces are next removed from the chamber, crushed and mashed. The resulting mash differs from the normal so-called "mealy mashed potato" insofar as it is not completely cooked and has a certain coherence and plasticity and can be shaped.

The potato mash is thereupon extruded at ordinary temperature and atmospheric pressure through suitable dies to form a macaroni-like product which is transferred to an oven where it is baked for up to 10 minutes at a temperature of between 200 and 220° C. whereupon it is transferred to a drying oven where it is dried at a temperature of 50 to 60° C. for a period of 15 to 30 minutes.

As previously stated, flavouring ingredients may be admixed with the potato mash prior to shaping. Alternatively the shaped material may be coated with flavouring ingredients such as meat-extract, treacle or salt.

According to another embodiment, potatoes after washing and peeling are cut into slices of about ¼ inch to 1 inch thick, and are immersed in boiling water for about 10 minutes.

When the slices at room temperature, are put into boiling water, the temperature rises suddenly in the outside layers of the slices and causes a sudden swelling and gelatinisation of the starch cells. The outer layer of gelatinised starch then prevents the rapid penetration of heat and moisture into the inside of the slices. The outer layer on being further exposed to water and heat is further gelatinised and the starch cells burst.

When the slices are removed from the treatment they are still underdone, having a core of material containing only slightly swollen starch grains. The tissues are however somewhat softened and permit mechanical disintegration and production of a coherent and plastic mash.

The thus treated potato slices are then mashed in a suitable machine, for example, a mincing machine to form a coherent and plastic mash.

The mash is extruded through, for example, a macaroni-making machine at ordinary temperature and atmospheric pressure, to form a macaroni-like product which is transferred to an oven where it is baked for 10 minutes at a temperature of 200 to 220° C., whereupon it is transferred to a drying chamber where the drying is carried out at a temperature of 50 to 60° C. in order to obtain a final product having a very low moisture content.

I claim:

1. A process for the production of food preparations from potatoes which comprises first peeling said potatoes, then subjecting said peeled potatoes to a cooking treatment adapted to gelatinise part of the starch and to burst some of the starch cells without however completely cooking said potatoes, thereupon mashing the thus treated material, extruding the mashed product under atmospheric pressure and at atmospheric temperature into a form adapted for rapid and uniform drying, thereupon subjecting the product to a baking treatment as a temperature upwards of about 200° C. for a period up to 10 minutes, and finally drying the product to a low moisture content.

2. A process for the production of food preparations from potatoes which comprises first peeling said potatoes, then subjecting said peeled potatoes to dry heat and thereafter to a steam treatment adapted to gelatinise part of the starch and to burst some of the starch cells without however completely cooking said potatoes, thereupon mashing the thus treated material, extruding the mashed product under atmospheric pressure and at atmospheric temperature, into a form adapted for rapid and uniform drying, thereupon subjecting the product to a baking treatment at a temperature upwards of about 200° C. for a period up to 10 minutes, and finally drying the product to a low moisture content.

3. A process for the production of food preparations from potatoes which comprises first peeling said potatoes, then subjecting said peeled potatoes to dry heat and thereafter to a treatment with boiling water adapted to gelatinise part of the starch and to burst some of the starch cells without however completely cooking said potatoes, thereupon mashing the thus treated material, extruding the mashed product under atmospheric pressure and at a temperature below the boiling point of water, into a form adapted for rapid and uniform drying, thereupon subjecting the product to a baking treatment at a temperature upwards of about 200° C. for a period up to 10 minutes, and finally drying the product to a low moisture content.

MARTIN CARL SCHAUL.

REFERENCES CITED

The following references are of record in the file of this patent:

UNITED STATES PATENTS

| Number | Name | Date |
|---|---|---|
| 2,190,063 | Gano | Feb. 13, 1940 |
| 2,339,757 | Baer | Jan. 25, 1944 |
| 2,401,392 | Ware et al. | June 4, 1946 |